UNITED STATES PATENT OFFICE.

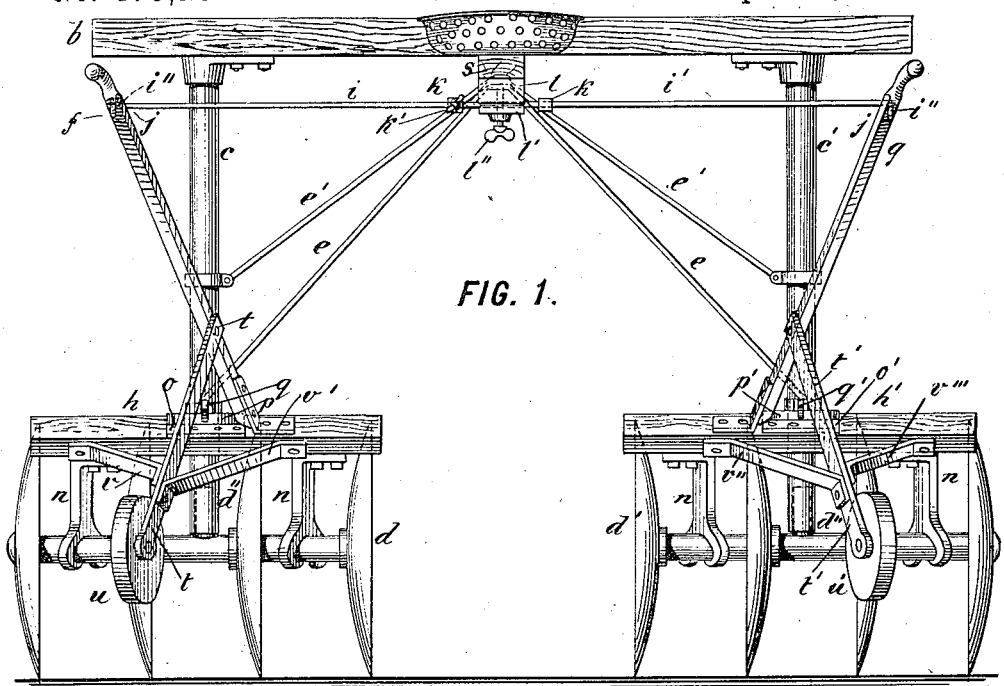

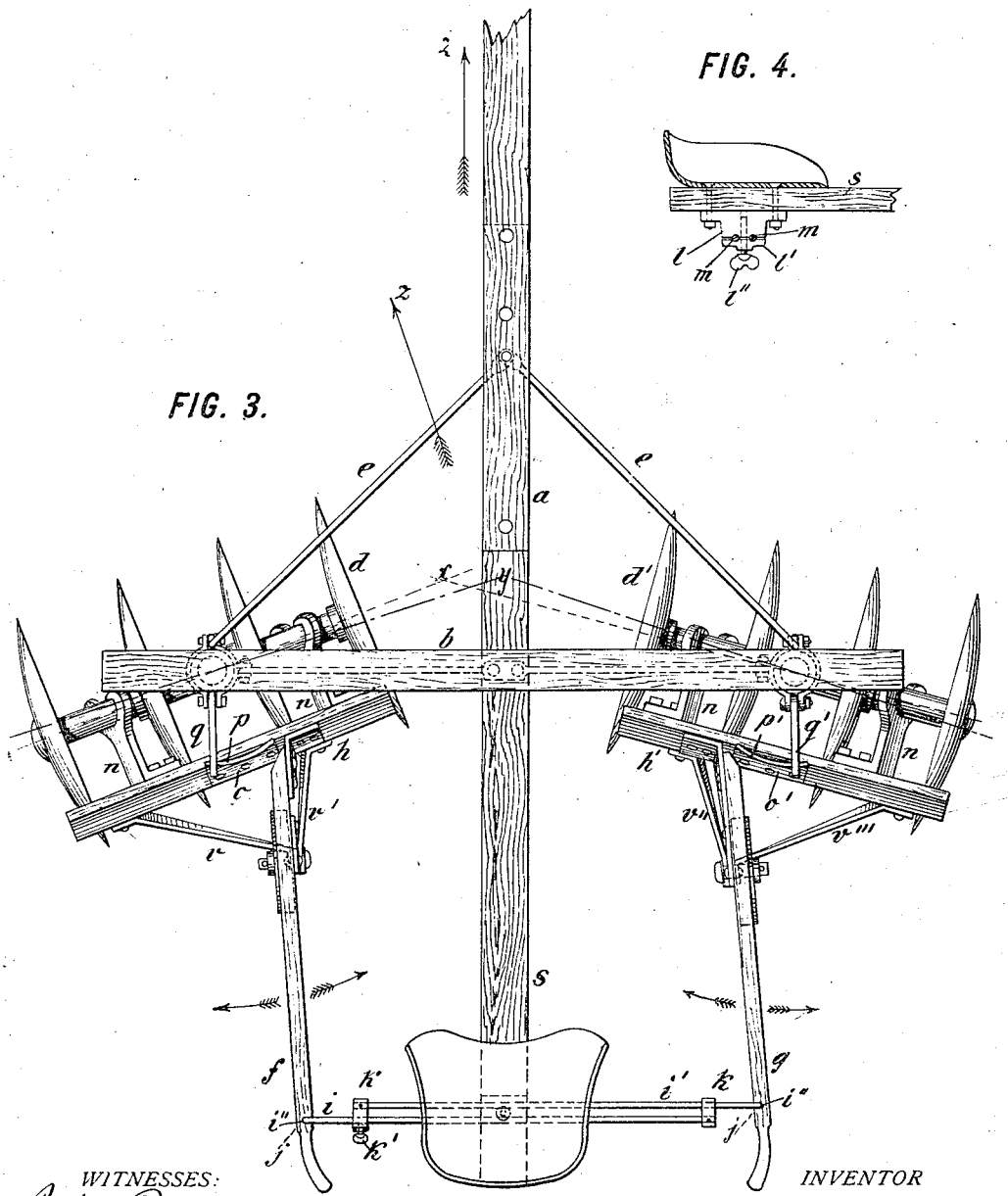

ANDREW GEORGE HILL, OF PRESCOTT, CANADA; TORRENCE EDWARD BISSELL ADMINISTRATOR OF SAID ANDREW GEORGE HILL, DECEASED.

DISK CULTIVATOR.

SPECIFICATION forming part of Letters Patent No. 473,257, dated April 19, 1892.

Application filed January 21, 1891. Serial No. 378,507. (No model.)

*To all whom it may concern:*

Be it known that I, ANDREW GEORGE HILL, a citizen of the United States, and a resident of the city of Prescott, in the Province of Ontario and Dominion of Canada, have invented certain new and useful Improvements in Disk Cultivators, of which the following is a specification, reference being had to the drawings forming part thereof.

This invention consists, first, in the combination, with two disk gangs, of means for simultaneously increasing the angle of one disk gang and diminishing the angle of the other gang, so that the harrow will be caused to move obliquely toward the side of the disk gang having the greatest angle, thereby permitting of the steering of the harrow by the driver, so that it may be caused to clear or dodge a hill that is out of line in the check-rows; second, in the combination, with two disk gangs, of means for independently adjusting the disk gangs to a given working angle and retaining the same at such angle; third, in certain other constructions and arrangements of parts hereinafter described and claimed.

In the drawings, Figure 1 is a rear elevation of a disk cultivator containing my improvements. Fig. 2 is a side view of the same. Fig. 3 is a plan view. Fig. 4 is a side view of the seat, with the clamp shown for retaining the rods tying together the handles operating the disk gangs.

$a$ is the rear end of the pole, to which is rigidly connected the main or cross beam $b$.

$c\ c'$ are two down-hangers, in the lower end of each of which are swiveled two disk gangs $d\ d'$—namely, in sockets at the points $d''\ d''$. These down-hangers, together with the main beam, are made rigid to the pole by means of the braces $e\ e\ e'\ e'$. The disk gangs are capable of being reversed, so as to throw the soil outwardly as well as inwardly, which latter is their operation when arranged relatively to each other, as shown by the drawings; but such disk gangs are not arranged so that their ends will have movement in the vertical plane, as the latter quality is not necessary for a disk cultivator working in check-rows, which work this harrow is principally intended to perform.

$f\ g$ are two handles respectively attached to the top of the disk-gang beams $h\ h'$ by bolts and nearly midway of said beams. The ends of these handles extend up to the driver's seat and within easy reach of his hands.

$i\ i'$ are two bars. One end of each is connected, respectively, to the upper ends of the handles $f\ g$ at $j\ j$ by means of hooks taking into the eyes $i''\ i''$ and connected together at their other ends by the sleeve $k$ and set-screw $k'$, the latter elements forming, when the proper adjustment is made, a clamp, and permitting of a movement of both disk gangs by the shifting of the two handles thus bound together.

$l\ l'$ is a casting made of two plates, the upper member $l$ being secured to the lower part of the driver's seat, and the lower member $l'$ being screwed up against the member $l$ by the clamp-screw $l''$. The inner ends of the two bars $i\ i'$ pass through openings $m\ m$ in the faces of the plates $l\ l'$. Such clamp prevents all movement of the handles and consequently of the disk gangs when working at a given angle.

In Figs. 1 and 2 the disk gangs are shown as being in line with each other, such position as they assume when going off or onto the working field and before being set at a working angle. It will be seen, Fig. 1, that the handles recede from one another. If the disk gangs are reversed—that is to say, the one changed over to the down-hanger of the other, so that the disks will throw the dirt outwardly instead of inwardly—then the handles will incline or converge toward each other. In the latter case, to give the disk gangs a working angle, they must be separated by means of the bars $i\ i$ and clamps $k\ k'$. In the former case, as shown in Fig. 1, to give the disk gangs a working angle, the handles must, on the contrary, be caused to converge toward each other.

The disk-gang beams are supported on the axles of the disk gangs by the standards $n\ n$, the lower ends of which partially grasp the axles in a novel manner. (Described and claimed in another application for Letters Patent now pending.)

$o\ o'$ are circular plates having rims $p\ p'$, one of each secured to the center of the top of the disk-gang beam in front of the down-hanger.

$q\ q'$ are two latches secured to bands $r\ r'$ on the down-hangers, the hooked ends of which engage with the said rims $p\ p'$, and thus retain the parts named and the handles connected therewith in an upright position.

The driver's seat is situated on the end of a standard or beam $s$, which is secured in the bifurcated rear portion of the pole, as seen in Fig. 2.

The operation of the cultivator after the disk gangs have been adjusted to the proper working angle (the way to adjust the same from the position of the gangs shown in Fig. 1 or of reversing the gangs will be evident from the description of the mechanism above given) is as follows, namely: If the hill is out of line in the row being cultivated and lying to the left hand of the driver, the handle $f$ is pushed to the right hand and toward the center of the harrow, thus moving simultaneously the handle $g$, the effect of which is to cause the disk gang $d$ to assume a greater angle and the disk gang $d'$ a lesser angle than the working-angle—in other words, increasing the angle of the left-hand gang and diminishing the angle of the right-hand gang. This will cause the harrow to at once move sidewise and toward the side of the gang having the greatest angle—namely, the left-hand side—thereby avoiding passing over the hill the harrow is approaching. The handles are as rapidly shifted again to have the disk gangs assume the normal working-angle after passing by the hill out of line. The positions of the disk gangs in Fig. 3 show the angles made by so shifting the handles $f$ and $g$. The letter $x$ shows where the axial lines of the disk gang axles if prolonged would intersect under such circumstances, and the letter $y$ the point where such lines would intersect when the said gangs are again brought into the position of a normal working angle. In the latter case the harrow moves in the direction of the arrow $z$, Fig. 3. By moving the handles in the other direction—that is, to the left hand—the harrow would be caused to move toward the right hand of the driver, and thus avoid crossing a hill out of line on that side. Thus the harrow by such simultaneous movements of the handles to the right or to the left can be steered by the driver to avoid cutting through the hills which may be out of line in the check-rows.

It is desirable at the end of the rows to lift the harrow over the hills, so as to leave them intact while starting to work back in the other direction, and to do this with as little trouble and loss of time as possible. I accomplish this end in the following manner, namely: At the rear of each of the handles $g\ f$ and at a short distance above their attachment to the disk-gang beams I pivot a leg or standard $t\ t'$. At the lower end of each of these legs is a carrying-wheel $u\ u'$, with sufficient breadth of periphery to keep it from sinking into the soil when counterpoising the disk gang thereon. These legs $t\ t'$ are in turn braced on each side to the disk-gang beams by the braces $v\ v'\ v''\ v'''$, two of them shorter than the others, so as to give the proper lateral position to the handles $g\ f$. These handles are held in the proper upright position by the latches $q\ q'$. These latches being raised from off of the rims $p\ p'$ will cause the carrying-wheels $u\ u'$ to drop to the ground, as shown by dotted lines in Fig. 2. Now by bearing down on the handles $g\ f$, so lowered, (see dotted lines, Fig. 2,) the carrying-wheels $u\ u'$ form fulcra and the disk gangs will be lifted clear of the ground, and thus at the ends of the rows permit of the manipulation of the cultivator, as above stated. When the handles are again raised, the latches $q\ q'$ will again engage with the rims $p\ p'$ and the harrow be again in a condition to do duty back along the check-rows.

I claim—

1. In disk cultivators, the combination, with two disk gangs, of two handles attached thereto and adjustable bars connected with said handles for simultaneously increasing the angle of one disk gang and diminishing the angle of the other gang, substantially as described.

2. In disk cultivators, the combination, with two disk gangs, of handles secured to the disk-gang beams at their lower ends and containing standards and carrying-wheels, and circular plates containing rims placed on the disk-gang beams and the latches engaging with such rims, substantially as described.

ANDREW GEORGE HILL.

Witnesses:
E. SMITH,
F. E. SMITH.